(12) United States Patent
Firth (10) Patent No.: US 11,793,157 B2
(45) Date of Patent: Oct. 24, 2023

(54) TRAY-SUPPORTED FLOOR MATS FOR LIVESTOCK HANDLING EQUIPMENT

(71) Applicant: Northquip Inc., Woodlands (CA)

(72) Inventor: Philip Malcolm Firth, Woodlands (CA)

(73) Assignee: Northquip Inc., Woodlands (CA)

( * ) Notice: Subject to any disclaimer, the term of this patent is extended or adjusted under 35 U.S.C. 154(b) by 1105 days.

(21) Appl. No.: 16/464,130

(22) PCT Filed: Jan. 16, 2017

(86) PCT No.: PCT/CA2017/050049
§ 371 (c)(1),
(2) Date: May 24, 2019

(87) PCT Pub. No.: WO2018/129606
PCT Pub. Date: Jul. 19, 2018

(65) Prior Publication Data
US 2019/0387705 A1 Dec. 26, 2019

(51) Int. Cl.
*A01K 1/015* (2006.01)

(52) U.S. Cl.
CPC .................. *A01K 1/0157* (2013.01)

(58) Field of Classification Search
CPC .................................................. A01K 1/0157
See application file for complete search history.

(56) References Cited

U.S. PATENT DOCUMENTS

| 5,486,392 | A | * | 1/1996 | Green | A47L 23/26 |
| | | | | | 52/177 |
| 5,687,534 | A | * | 11/1997 | Kongsgaard | A01K 1/0151 |
| | | | | | 119/528 |
| 5,813,365 | A | * | 9/1998 | Helmy | A01K 1/0151 |
| | | | | | 119/528 |
| 5,816,190 | A | * | 10/1998 | van der Lely | A01K 1/12 |
| | | | | | 119/14.08 |
| 5,937,793 | A | * | 8/1999 | Church | A01K 1/0151 |
| | | | | | 119/528 |

(Continued)

FOREIGN PATENT DOCUMENTS

| DE | 202004017217 U1 | * | 4/2006 | ........... A01K 1/0157 |
| WO | WO-0110196 A1 | * | 2/2001 | ........... A01K 1/0151 |

*Primary Examiner* — Monica L Perry
*Assistant Examiner* — Brittany A Lowery
(74) *Attorney, Agent, or Firm* — Kyle R Satterthwaite; Ryan W Dupuis; Ade & Company Inc.

(57) ABSTRACT

A floor assembly for livestock handling equipment features a pair frame members lying in a longitudinal direction and spaced apart from one another in a lateral direction transverse to said longitudinal direction, and at least one support tray connected to the frame members and spanning therebetween in the lateral direction. At least one mat is supported atop the support tray(s). The mat is made of rubber or other resilient material for improved footing and comfort of the livestock. The topside of each mat is flush with a topside of the frame members to provide an even floor surface across the full area floor area. The mat(s) are removable for cleaning, and open gaps around the support tray(s) are provided for drainage. Non-welded attachment enables convenient removal and replacement of the support trays in the event of rust or other damage.

27 Claims, 4 Drawing Sheets

(56) References Cited

U.S. PATENT DOCUMENTS

| | | | | |
|---|---|---|---|---|
| 6,079,363 | A  * | 6/2000 | MacLaine | A01K 1/0107 |
| | | | | 119/161 |
| 7,066,111 | B2 * | 6/2006 | McGregor | A01K 1/0151 |
| | | | | 119/528 |
| 8,413,392 | B2 * | 4/2013 | Van Der Velden | A01K 1/0151 |
| | | | | 52/302.1 |
| 8,726,612 | B2 * | 5/2014 | Lomske | E04F 15/105 |
| | | | | 52/177 |
| 10,674,701 | B2 * | 6/2020 | Kramer | A01K 1/0103 |
| 2015/0334980 | A1 * | 11/2015 | Van Raam | A01K 1/01 |
| | | | | 52/302.1 |

* cited by examiner

TRAY-SUPPORTED FLOOR MATS FOR LIVESTOCK HANDLING EQUIPMENT

This application is the national stage of PCT/CA2017/050049, filed Jan. 16, 2017.

FIELD OF THE INVENTION

The present invention relates generally to livestock equipment, and more specifically to floor assemblies for same that include one or more mats for improved comfort and footing for the animal relative to conventional steel floors.

BACKGROUND

It has been previously proposed in the art to provide a rubber coating on the floor of a livestock squeeze chute for improved gripping between the floor and the feet of the livestock. An example of such a rubber coated squeeze chute floor is disclosed in U.S. Pat. No. 5,111,773. Similarly, U.S. Patent Application Publication 2009/0145364 discloses a rubber coated platform in a livestock treatment carousel.

However, a permanent rubber coating over a continuous steel floor or platform has several limitations, including draining of fluids and muck from the floor and accessibility of floor components for cleaning, inspection, repair and replacement.

Other references disclose use of rubber mats in stables, factories and other animal housing environments, for example as disclosed in U.S. Patent Application Publication No. 2014/0060450 and U.S. Pat. Nos. 3,699,926; 6,220,205; and 5,989,695. However, these references focus on the structure and compositions of the mats themselves, and provide no suggestion of how to incorporate such matting into the floor structure of a squeeze chute or other piece of livestock handling equipment.

Accordingly, there remains room for improvement in padded floor assemblies for squeeze chutes and other livestock handling equipment.

SUMMARY OF THE INVENTION

According to one aspect of the invention there is provided a floor assembly for livestock handling equipment, said floor assembly comprising:
  at least one support tray connected or connectable to longitudinal frame members of the livestock handling equipment in an installed position spanning between said frame members in a lateral direction transverse to a longitudinal direction spanned by said frame members; and
  at least one mat supported or supportable atop said at least one support tray in the installed position thereof to provide a mat-lined floor surface between said longitudinally oriented frame members.

Preferably said at least one support tray comprises a central support area arranged residing or arranged to reside at an elevation lesser than a topside of the frame members in said installed position.

Preferably said at least one support tray comprises mounting flanges disposed at opposing ends of said central support area at an elevation greater than said central support area.

Preferably said mounting flanges are seated atop the frame members.

Preferably said at least one support tray comprises a set of multiple support trays.

Preferably the support trays are identical to one another.

The support trays may comprise fastener holes therein by which the at least one mat is fastenable to said support trays.

In the installed position, preferably the set of support trays are arranged in a series along said longitudinal frame members and include two end support trays respectively disposed at opposing ends of the series, each mat comprises respective sets of end-adjacent fastener holes therein at locations adjacent opposing ends of the mat, each support tray comprises an edge-adjacent set of fastener holes adjacent only one of two transversely-oriented edges of the support tray, and the two end support trays are in opposing orientations relative to one another to place the respective edge-adjacent set of fastener holes in alignment under a different set of the end-adjacent fastener holes.

Preferably said at least one mat comprises multiple mats and the set of support trays includes a shared support tray underlying two adjacent mats, said shared support tray having two center-adjacent sets of fastener holes near a transverse center line thereof for respective fastening of said two adjacent mats to said shared support tray.

In the installed position, preferably the plurality of support trays are spaced from one another in the longitudinal direction to leave gaps between said trays.

The longitudinal frame members may have predefined mounting holes therein at predetermined longitudinal spacing by which the support trays are spaced from one another in the longitudinal direction by said gaps when mounted to the frame members in the installed position using said mounting holes.

Preferably each mat spans more than one support tray in the longitudinal direction.

Preferably said at least one mat comprises a plurality of mats each spanning across a respective set of one or more support trays in the longitudinal direction.

Preferably said plurality of mats are abutted end-to-end in the longitudinal direction to collectively define an uninterrupted mat area spanning from one end of the floor assembly to another.

Preferably each support tray is detachably connected or connectable to the frame members.

Preferably each support tray comprises a non-welded connection to the frame members.

Preferably removable fasteners are provided by which the at least one support tray is removably fastened or fastenable to the frame members.

Preferably said removable fasteners are shearable.
Preferably said removable fasteners are drillable.
Preferably said removable fasteners comprise rivets.
Preferably a set of mat fasteners are provided by which the at least one mat is fastened or fastenable to the at least one support tray.

Preferably the at least one mat is removable from the at least one support tray.

Preferably the at least one mat is fastened to the at least one support tray in a manner more readily removable therefrom than the at least one support tray is removable from the frame members.

Preferably said mat fasteners are more readily removable than said removable fasteners by which by which the at least one support tray is removably fastened or fastenable to the frame members Preferably the mat fasteners comprise removable threaded fasteners.

Preferably a topside of each mat is positioned, or arranged to be positioned, generally flush with an upper surface of each frame member with the at least one mat seated atop the installed position of the at least one support tray.

Preferably each mat is resiliently compressible in a thickness direction thereof.

Preferably each mat comprises rubber material.

In original equipment embodiments, where the floor assembly is assembled during production of the overall piece of livestock equipment, said floor assembly includes said longitudinal frame members.

In other embodiments, the floor assembly is provide as a kit lacking said longitudinal frame members, whereby the tray(s) and mat(s) of the kit are intended for aftermarket or retrofit installation on the longitudinal frame members of a pre-existing piece of livestock equipment.

According to another aspect of the invention, there is provided a method of servicing the floor assembly in which removable fasteners fasten each support tray to the frame members, said method comprising shearing, punching and/or drilling out one or more of the removable fasteners to remove one or more support trays for replacement thereof.

Preferably the method further includes installing one or more replacement support trays using a same type of fastener which was sheared, punched and/or drilled out during the removal of said one or more support trays.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
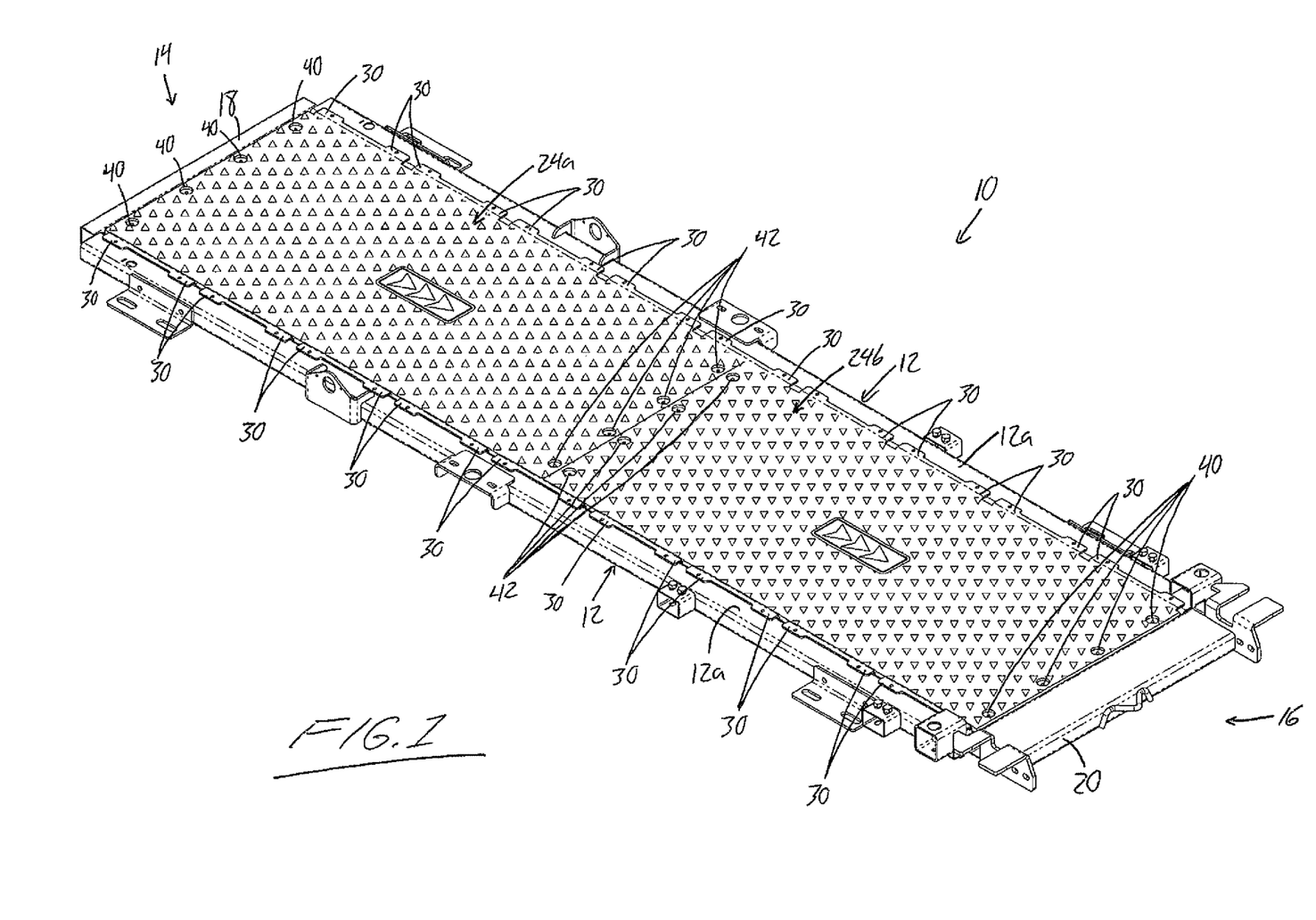
FIG. 1 is an assembled overhead perspective view of a squeeze chute floor assembly according to the present invention.

FIG. 1 shows a fully assembled floor assembly 10 for a livestock squeeze chute. The floor assembly features two longitudinal frame members 12 running horizontally parallel to one another in a longitudinal direction of the squeeze chute from an entrance end 14 at which the livestock enter the chute to an opposing exit end 16. At the exit end 16, the squeeze chute will typically feature an openable/closable head gate for temporarily holding the head of the animal prior to exit thereof from the chute. A first cross-member 18 spans perpendicularly between the longitudinal frame members 12 at the entrance end 14, and a second cross-member 20 likewise spans perpendicularly between the longitudinal frame members 12 at the exit end 16. Collectively, the longitudinal frame members and cross-members form a rectangular base frame or chassis of the squeeze chute, the remainder of which is omitted for ease of illustration, and may be of conventional construction. As illustrated, the longitudinal frame members and cross-members may be formed by respective lengths of rectangular metal tubing, though use of other constructions are also within the scope of the present invention.

Figure 2:
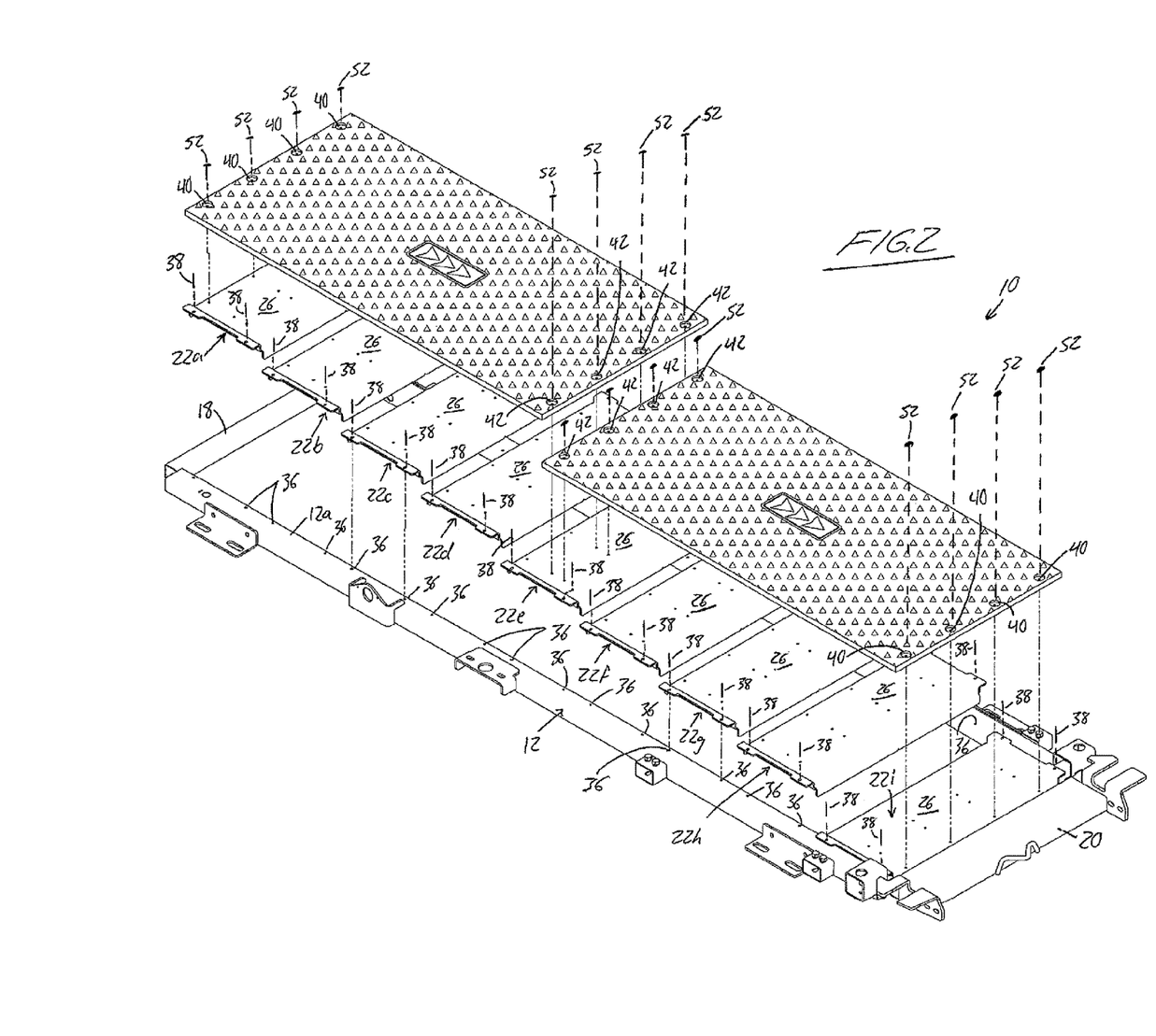
FIG. 2 is an exploded overhead perspective view of the squeeze chute floor assembly of FIG. 1.

Turning to FIG. 2, the exploded view of the floor assembly reveals the inclusion of a series of support trays 22a-22i attached to the longitudinal frame members 12 in the space delimited between the two cross members 18, 20. Of these support trays, a first end tray 22a at one end of the series resides adjacent the first cross-member 18 at the entrance end 14 of the floor assembly, and a second end tray 22i resides at the opposing end of the series adjacent the second cross-member 20 at the exit end 16 of the floor assembly. A set of intermediate trays reside between the two end trays, and includes a center tray 22e residing at the longitudinal center of the floor assembly. The illustrated embodiment features a total nine trays in the overall series, but it will be appreciated that this number may vary. In the illustrated embodiment, the trays are all identical to one another in construction, and are evenly distributed in the longitudinal direction of the floor assembly.

The purpose of the support trays is to carry a set of rubber mats 24a, 24b atop the trays within the rectangular inner space of the base frame, as delimited by the longitudinal frame members 12 and cooperating cross-members 18, 20. FIG. 1 shows the fully assembled state of the floor assembly, in which a substantial entirety of this rectangular inner frame space is fully occupied by the set of rubber mats 24a, 24b. The mats 24a, 24b are placed end-to-end with one another in the longitudinal direction of the floor assembly. In the illustrated two-mat embodiment, the mats 24a, 24b meet in abutment or close adjacency to one another above the center tray 22e at the longitudinal center of the floor assembly. Opposite these meeting-together inner ends of the two mats, each mat features an outer end that resides in abutment with or close adjacency to a respective one of the cross-members 18, 20. Accordingly, the end-to-end placement of the mats provides an uninterrupted, substantially continuous mat surface spanning from one end of the floor assembly to the other. The width of each mat spans nearly the full width of the inner frame space, as measured between the two longitudinal frame members in a lateral direction that is perpendicular to the two longitudinal frame members and parallel to the cross members 18, 20. Accordingly, the set of mats collectively span a substantial entirety of both the longitudinal and lateral dimensions of the inner frame space of the floor assembly. In the two-mat example of the illustrated embodiment, each mat spans a respective half of the center tray 22e, plus the entirety of one of the end trays 22a, 22i, and the entirety of each intermediate tray disposed between said respective end tray and the center tray. Underlying the inner end of the both mats, the center tray 22e is thus also referred to herein a shared tray partially occupied by multiple mats.

Figure 3:
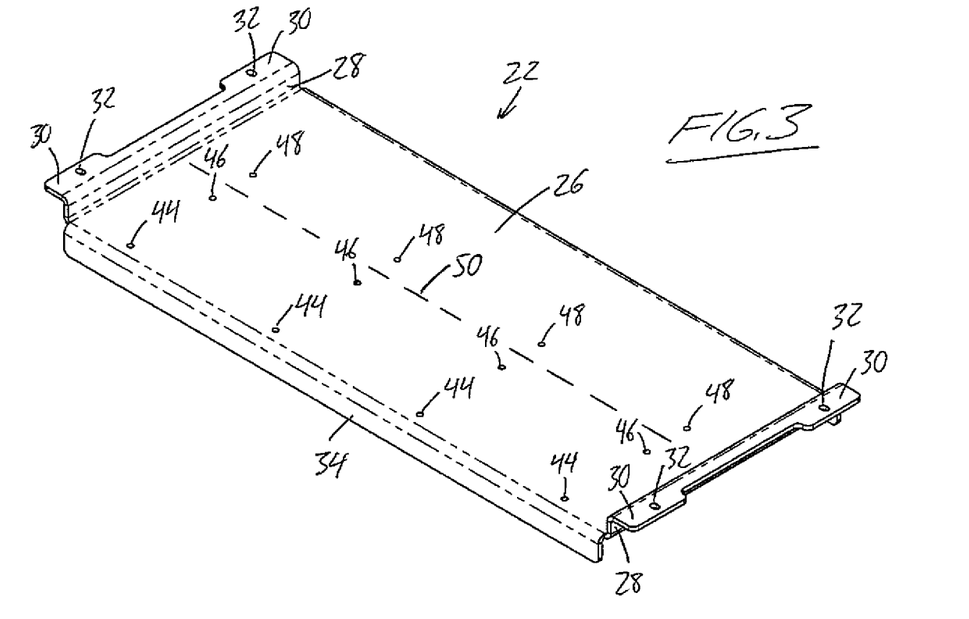
FIG. 3 is an isolated perspective view of a singular support tray from the squeeze chute floor assembly of FIG. 1.
Figure 4:
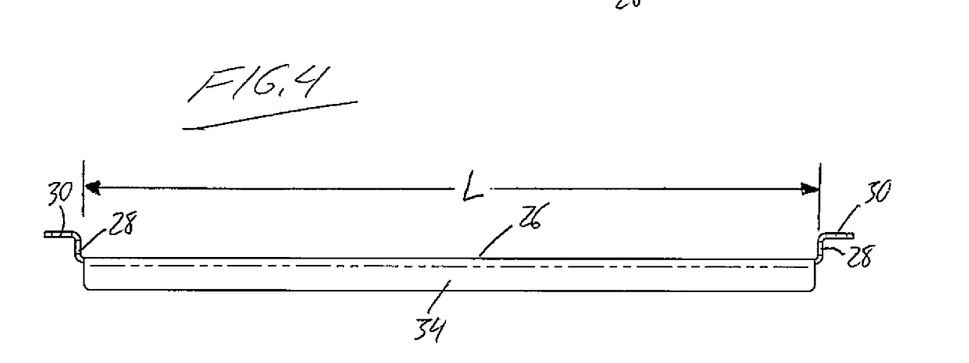
FIG. 4 is a side elevational view of the singular support tray of FIG. 3.
Figure 5:
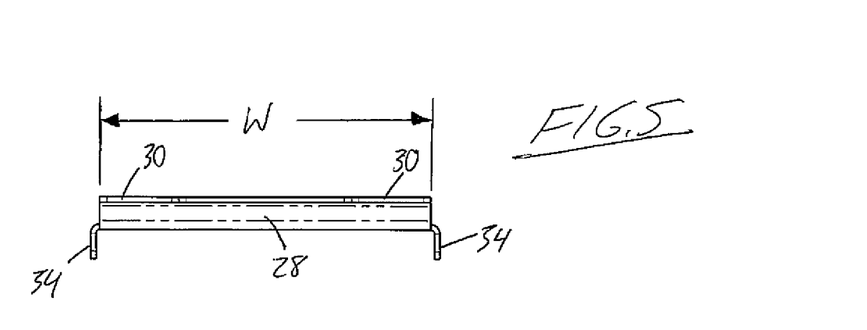
FIG. 5 is an end elevational view of the singular support tray of FIG. 3.

FIGS. 3 to 5 illustrate one support tray 22 from the series of identical support trays 22a-22i. The tray 22 features a main rectangular panel 26 whose topside denotes a central support area of tray. In the illustrated embodiment, the main rectangular panel 26 has a length dimension L that exceeds a perpendicular width dimension W thereof and lies parallel to the transverse direction of the floor assembly. The shorter width dimension W of the tray thus lies in the longitudinal direction of the overall floor assembly. However, the sizing and relative width and length of each tray may vary from those of illustrated embodiment. At opposite ends of the main panel's length dimension L, a respective pair of short end walls 28 stand perpendicularly upright from the topside of the main panel 26. At the top end of each upright end wall 28, a pair of mounting flanges 30 project perpendicularly outward from the upright end wall 28 at opposite ends thereof to present an overhang reaching outwardly from the main panel 26 at an elevated plane thereabove. Each mounting flange 30 features a respective mounting hole 32 therein. At opposing lengthwise side edges of the main panel 26, a pair of downturned walls 34 respectively hang perpendicularly downward from the main panel 26 over the full length L of the main panel 26 between the two upright end wall 28.

Turning back to FIG. 2, with specific referenced to the installed position of the second end tray 22i, the main panel 26 of the tray 22i resides between the facing-together inner sides of the two longitudinal frame members 12. At the inner side of each longitudinal frame member 12, a respective end wall 28 of the tray 22i spans upwardly along the inner side of the longitudinal frame member 12 to the topside 12a thereof, where the overhanging mounting flanges 30 span outwardly from the tray's end wall 28 over the topside 12a of the longitudinal frame member 12. Each longitudinal frame member includes a set of mounting apertures 36 in the topside 12a thereof at spaced locations along the longitudinal direction of the flooring assembly. Each of these mounting apertures 36 aligns with a respective one of the mounting holes 32 in the support tray mounting flanges 30. Each support tray is fastened to the longitudinal frame members 12 by rivets 38 that are fastened through the aligned mounting holes and apertures at the four mounting flanges 30 of the tray. This connects the support tray to the longitudinal frame members 12 in an installed position spanning the lateral dimension of the inner frame space between the two longitudinal frame members 12, with the main panel 26 of the tray residing at a reduced elevation below the topsides 12a of the longitudinal frame members. The two longitudinal frame members 12 are of equal, uniform cross section so that their topsides 12a reside in a shared horizontal plane, whereby the main panels 26 of the identically structured and identically mounted supports trays all lie coplanar with one another at the reduced elevation recessed below the shared plane of the frame member topsides 12a.

The topsides of the main panels 26 of the series support trays thus form central support areas on which the mats 24a, 26b are seated. The thickness of each mat 24a, 24b is equal to the height of each tray end wall 28, whereby the topsides of the mats lie flush with the topsides of the longitudinal frame members 12 when the mats are seated atop the installed support trays. The width of each mat in the lateral direction of the base frame is generally equal to the length L of each tray's main panel 26, whereby the mat fully spans between the two end walls 28 of each underlying support tray so as to substantially occupy the entire lateral dimension of the inner frame space delimited between the two longitudinal frame members 12. Accordingly, with the mats placed end-to-end so that their collective length spans fully from one cross-member to the other to occupy the full longitudinal dimension of the inner frame space, the entirety of the inner frame space is substantially spanned by the mats in both directions.

For fastening the mats 24a, 24b to the support trays, each mat comprises two sets of end-adjacent fastener holes 40, 42 disposed respectively adjacent the two longitudinally-spaced ends of the mat. Each tray 22 features three sets of fastener holes in the main panel 26 thereof, namely one set of edge-adjacent fastener holes 44, and two sets of center-adjacent fastener holes 46, 48. The edge-adjacent fastener hole set 44 in the main panel 26 is defined adjacent one of the lengthwise side edges thereof that lie in the lateral direction of the finished floor assembly. The two center-adjacent fastener hole sets 46, 48 are situated near a centerline 50 of the tray's main panel 26 in symmetric relation to one another across this center line 50, which lies parallel to the two lengthwise side edges of the main panel 26.

Mat 24a has its end-adjacent fastener hole set 40 aligned over the edge-adjacent fastener hole set 44 of the first end tray 22a, and its other end-adjacent fastener hole set 42 aligned over one of the center-adjacent fastener hole sets 46 of the shared center tray 22e. Likewise, mat 24b has its end-adjacent fastener hole set 40 aligned over the edge-adjacent fastener hole set 44 of the second end tray 22i, and its other end-adjacent fastener hole set 42 aligned over the other center-adjacent fastener hole set 48 of shared center tray 22e. To accomplish this, the two end trays 22a, 22i are situated in opposing orientations relative to one another, whereby the edge-adjacent fastener hole set 44 of first end tray 22a resides adjacent the first cross-member 18 and thus nearest to the entrance end 14 of the assembly, while the edge-adjacent fastener hole set 44 of second end tray 22i resides adjacent the second cross-member 20 and thus nearest to the exit end 16 of the assembly.

In the illustrated embodiment where each mat spans multiple tray widths, the center-adjacent fastener holes 46, 48 of the trays are used only at the shared center tray 22e where the ends of the two mats 24a, 26b meet one another. In this embodiment, where the full length of the floor assembly is spanned by two mats, the edge-adjacent fastener holes 44 of the trays are used only at the end trays 22a, 22i that underlie the outer ends of the two mats. While the illustrated embodiment uses identical trays each having the same fastener hole layout, thereby reducing the number of distinct parts to manufacture, other embodiments may have different hole layouts at different trays according to their particular installed positions in the series relative to the mats. The inclusion of only one edge-adjacent set of fastener holes 44 per tray reduces the number of holes to be created during manufacture of the trays, thereby reducing fabrication steps and/or machinery components, but requires a particular orientation of each end tray 22a, 22i during assembly. Alternatively, a second edge-adjacent hole set may be included at the opposing side of the tray, in which case each tray can be installed in any orientation.

Figure 6:
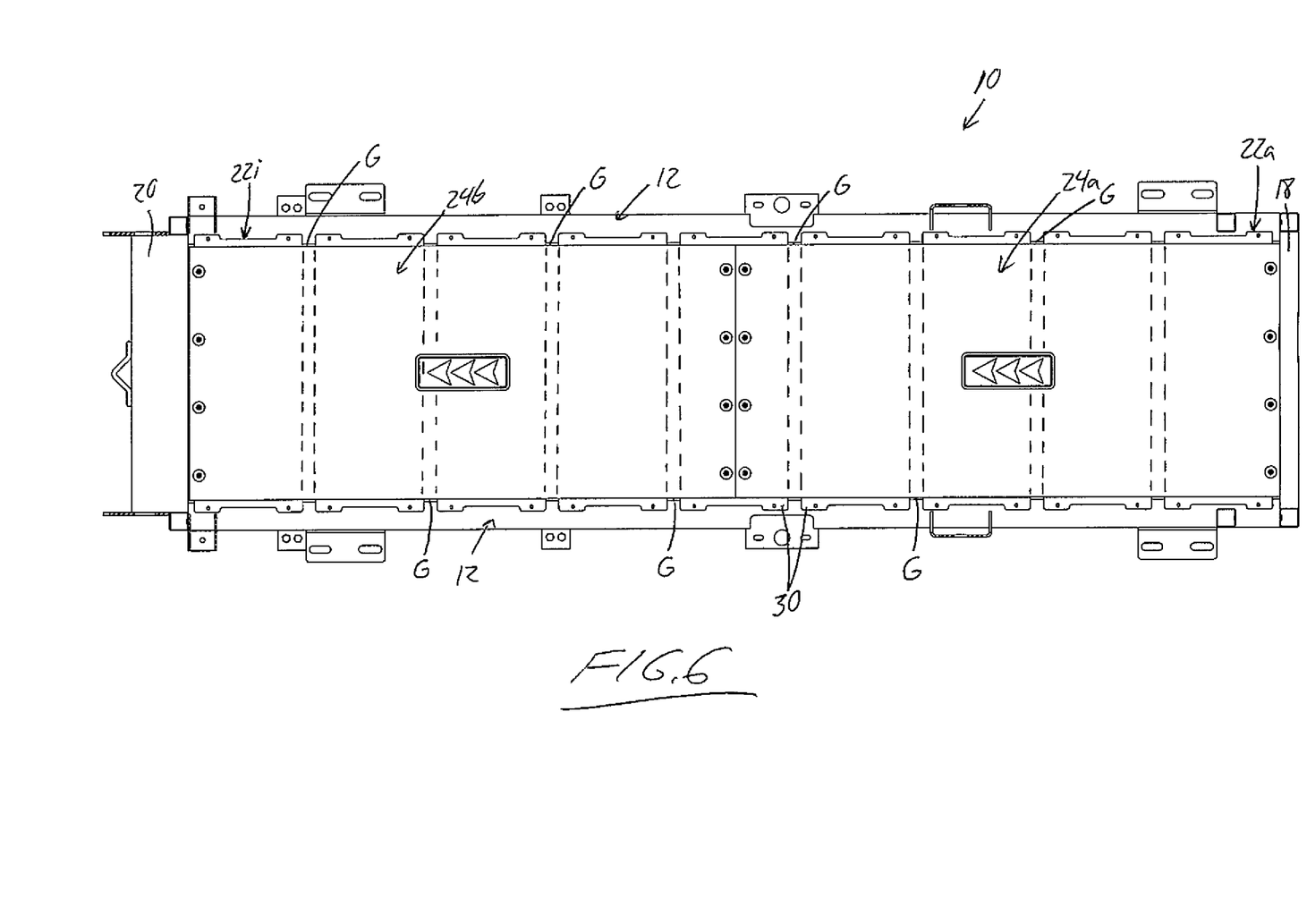
FIG. 6 is an overhead plan view of the assembled squeeze chute floor assembly of FIG. 1.

The mats 24a, 24b are fastened down to the support trays by threaded screw fasteners 52 driven through the mat's fastening holes 40, 42 and into the fastening holes 44, 46, 48 of the trays. As shown, the fastening holes of each mat may be counter-sunk at the topside of the mat so that the screw heads are recessed therefrom. Used of threaded screw fasteners enables convenient and easy removal of the mats for thorough cleaning of both the mats and the underlying support trays. To allow liquid and muck to drain from the floor assembly during cleaning, the trays 22a-22i are installed at spaced apart positions in the longitudinal direction of the frame to leave open gap spaces between the adjacent trays. Likewise, during use of the squeeze chute, any liquid or muck that may seep down under the mats at the seams or small gaps between adjacent mats, and between the mats and the surrounding members 12, 18, 20 of the base frame, can likewise drain through these open gaps between the trays. The gaps G are most apparent in the drawings in FIG. 6, where the two ends of each gap are visible between mounting flanges of adjacent trays, and the majority of each gap beneath is located beneath the installed mats, and thus denoted by broken lines.

The rubber mats are resiliently compressible, at least in the thickness direction thereof, and thus undergo a small amount of sponge-like compression when stepped on by the livestock. This provides improved grip for more confident footing, and thus less chance of slippage relative to a steel or other hard floor surface. The rubber mats also provide a softer more comfortable feel to the animals, not only when standing or walking on the floor, but also by providing reduced impact force and softer support in the event of an animal fall inside the chute. While described mats are of rubber composition, other resiliently compressible materials of suitable durability may alternatively be used to similar effect.

With the topside of the mat residing generally flush with the topsides of the longitudinal frame members, the overall floor structure is generally planar across its entire lateral dimension to minimize tripping or stumbling hazards that might otherwise be presented by uneven surfaces at the topside of the floor assembly.

The riveted installation of the support trays is preferable over welded attachment, as it provides semi-permanent yet removal attachment of the trays to the frame. In the event that the trays become rusted or otherwise damaged, the rivets can be removed, for example by shearing off the heads of the rivets and punching or drilling out the pins of the rivets, and new trays then installed by riveting in a replacement set of trays. No specialized welding skills or equipment are required. The screw-based fastening of the mats enables even easier removal thereof to enable periodic cleaning of the underlying supports trays, and thorough cleaning or replacement of the mats.

Like the number of trays, the number of mats may be varied from the two-mat configuration of the illustrated embodiment, and the number of trays spanned by each individual mat may likewise be varied. Additionally, while the illustrated embodiment is described as the floor assembly of a squeeze chute, the same general layout of one or more support trays spanning between longitudinal frame members to support one or more mats may likewise be employed in a floor assembly for other livestock handling equipment.

The floor assembly may be incorporated into new equipment builds during original manufacture of same. Additionally or alternatively, the invention may be marketed in the form of an aftermarket installation kit comprising a set of support trays for retrofit installation on an existing piece of livestock equipment by fastening of the support trays between the existing frame members of the equipment. Suitably dimensioned mats may be included as part of the kit, or sold separately therefrom. The kit may include fasteners for mounting the trays and fastening the mat to the mounted trays, or one or more of these fastener sets may be separately acquired.

While the illustrated embodiment is described as having pre-defined mounting holes in the frame members and tray flanges, and pre-defined fastener holes in the mats and trays, other embodiments may vary from this configuration. In the event of aftermarket installation, the installer can drill rivet-accepting mounting holes in the frame members of the pre-existing livestock equipment. If the support trays lack predefined fastener holes, self-drilling/self-tapping screws may be used to fasten down the mats, which likewise may optionally lack pre-defined fastener holes.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A floor assembly for livestock handling equipment, said floor assembly comprising:
    longitudinal frame members delimiting an inner frame space therebetween;
    a plurality of support trays connected to the longitudinal frame members in installed positions spanning between said frame members in a lateral direction transverse to a longitudinal direction spanned by said frame members, said support trays being spaced from one another in the longitudinal direction to leave drainage gaps between said support trays; and
    a plurality of mats supported atop said support trays in the installed position thereof to provide a mat-lined floor surface between said longitudinally oriented frame members;
    wherein:
    the plurality of mats reside end-to-end with one another in the longitudinal direction and collectively provide a substantially continuous mat surface uninterruptedly spanning, in substantial entirety, both an overall length of the inner frame space from one end thereof to another in the longitudinal direction, and an overall width of the frame space measured from one of the longitudinal frame members to the other in the lateral direction;
    said plurality of mats includes two adjacent mats that meet end-to-end with one another atop a shared one of said support trays that underlies both of said two adjacent mats; and
    a dimension of each of said drainage gaps between the support trays, measured in the longitudinal direction, is lesser than a corresponding dimension of each support tray that is likewise also measured in said longitudinal direction, and the overall length of the inner frame space, from said one end thereof to the other, is occupied more by the support trays than by the drainage gaps therebetween.

2. The floor assembly of claim 1 wherein each support tray comprises a central support area residing at an elevation lesser than a topside of the frame members, the plurality of mats are seated atop the central support areas of said plurality of support trays, and each support tray comprises mounting flanges disposed at laterally opposing ends of said central support area at an elevation greater than said central support area.

3. The floor assembly of claim 2 wherein said mounting flanges are seated atop the frame members.

4. A floor assembly for livestock handling equipment, said floor assembly comprising:
    longitudinal frame members delimiting an inner frame space therebetween;
    at least one support tray connected to the longitudinal frame members in an installed position spanning between said frame members in a lateral direction transverse to a longitudinal direction spanned by said frame members; and
    at least one mat supported or supportable atop said at least one support tray in the installed position thereof to provide a mat-lined floor surface between said longitudinally oriented frame members;
    wherein:
    said at least one support tray comprises a set of multiple support trays;
    the set of multiple support trays comprise fastener holes therein by which the at least one mat is fastenable to said support trays; and
    the set of multiple support trays are arranged in a series along said longitudinal frame members and include two end support trays respectively disposed at opposing ends of the series, each mat comprises respective sets of end-adjacent fastener holes therein at locations adjacent opposing ends of the mat, each support tray comprises an edge-adjacent set of fastener holes adjacent only one of two transversely-oriented edges of the support tray, and the two end support trays are in opposing orientations relative to one another to place the respective edge-adjacent set of fastener holes in alignment under a different set of the end-adjacent fastener holes.

5. A floor assembly for livestock handling equipment, said floor assembly comprising:
longitudinal frame members delimiting an inner frame space therebetween;
at least one support tray connected to the longitudinal frame members in an installed position spanning between said frame members in a lateral direction transverse to a longitudinal direction spanned by said frame members; and
at least one mat supported or supportable atop said at least one support tray in the installed position thereof to provide a mat-lined floor surface between said longitudinally oriented frame members;
wherein:
said at least one support tray comprises a set of multiple support trays; and
said at least one mat comprises multiple mats and the set of support trays includes a shared support tray underlying two adjacent mats, said shared support tray having two center-adjacent sets of fastener holes near a transverse center line thereof for respective fastening of said two adjacent mats to said shared support tray.

6. The floor assembly of claim 1 wherein a length of each mat in the longitudinal direction exceeds the dimension of each support tray in the longitudinal direction.

7. The floor assembly of claim 6 wherein said length dimension of each mat exceeds the dimension of multiple support trays in the longitudinal direction.

8. The floor assembly of claim 1 wherein each support tray is detachably connected or connectable to the frame members.

9. The floor assembly of claim 1 wherein each support tray comprises a non-welded connection to the frame members.

10. The floor assembly of claim 1 comprising removable fasteners by which the at least one support tray is removably fastened or fastenable to the frame members.

11. The floor assembly of claim 10 wherein said removable fasteners are shearable.

12. The floor assembly of claim 10 wherein said removable fasteners are drillable.

13. The floor assembly of claim 10 wherein said removable fasteners comprise rivets.

14. The floor assembly of claim 1 wherein each support tray is riveted to the frame members.

15. The floor assembly of claim 1 comprising a set of mat fasteners by which the at least one mat is fastened or fastenable to the at least one support tray.

16. The floor assembly of claim 10 comprising a set of mat fasteners by which the at least one mat is fastened or fastenable to the at least one support tray, said mat fasteners being more readily removable than said removable fasteners by which the at least one support tray is removably fastened or fastenable to the frame members.

17. The floor assembly of claim 15 wherein the mat fasteners comprise removable threaded fasteners.

18. The floor assembly of claim 1 wherein the at least one mat is removably supported on the at least one support tray.

19. The floor assembly of claim 1 wherein the at least one support tray is fastened to the frame members and the at least one mat is fastened to the at least one support tray in a manner more readily removable therefrom than the at least one support tray is removable from the frame members.

20. The floor assembly of claim 1 wherein a topside of each mat is positioned, or arranged to be positioned, generally flush with an upper surface of each frame member with the at least one mat seated atop the installed position of the at least one support tray.

21. The floor assembly of claim 1 wherein each mat is resiliently compressible in a thickness direction thereof.

22. The floor assembly of claim 1 wherein each mat comprises rubber material.

23. A method of servicing the floor assembly of claim 10 comprising shearing, punching and/or drilling out one or more of the removable fasteners to remove one or more of the at least one support tray for replacement thereof.

24. The method of claim 23 comprising installing one or more replacement support trays using a same type of fastener which was sheared, punched and/or drilled out during the removal of said one or more of the at least one support tray.

25. A floor assembly for livestock handling equipment, said floor assembly comprising:
longitudinal frame members delimiting an inner frame space therebetween;
a plurality of support trays connected to the longitudinal frame members in installed positions spanning between said frame members in a lateral direction transverse to a longitudinal direction spanned by said frame members, said support trays being spaced from one another in the longitudinal direction to leave drainage gaps between said support trays; and
a plurality of mats supported atop said support trays in the installed position thereof to provide a mat-lined floor surface between said longitudinally oriented frame members;
wherein:
the plurality of mats reside end-to-end with one another in the longitudinal direction and collectively provide a substantially continuous mat surface spanning, in substantial entirety, both an overall length of the inner frame space from one end thereof to another in the longitudinal direction, and an overall width of the frame space measured from one of the longitudinal frame members to the other in the lateral direction;
each of said plurality of mats occupies more than one of the support trays; and
a dimension of each of said drainage gaps between the support trays, measured in the longitudinal direction, is lesser than a corresponding dimension of each support tray that is likewise also measured in said longitudinal direction, and said overall length of the inner frame space is occupied more by the support trays than by the drainage gaps therebetween.

26. A livestock chute comprising the floor assembly of claim 1.

27. A livestock chute comprising the floor assembly of claim 25.

* * * * *